US006737861B2

(12) United States Patent
Lantto (10) Patent No.: US 6,737,861 B2
(45) Date of Patent: May 18, 2004

(54) METHOD FOR DETERMINING THE POSITION OF THE ROTOR OF AN ELECTRIC MACHINE, AND A POSITION SENSOR

(75) Inventor: Erkki Lantto, Helsinki (FI)

(73) Assignee: High Speed Tech Oy Ltd., Espoo (FI)

( * ) Notice: Subject to any disclaimer, the term of this patent is extended or adjusted under 35 U.S.C. 154(b) by 15 days.

(21) Appl. No.: 10/181,492

(22) PCT Filed: Jan. 16, 2001

(86) PCT No.: PCT/FI01/00035

§ 371 (c)(1),
(2), (4) Date: Oct. 25, 2002

(87) PCT Pub. No.: WO01/53774

PCT Pub. Date: Jul. 26, 2001

(65) Prior Publication Data

US 2003/0122541 A1 Jul. 3, 2003

(30) Foreign Application Priority Data

Jan. 20, 2000 (FI) .............................................. 20000112

(51) Int. Cl.⁷ ............................. G01B 7/30; G01B 7/14; G01B 7/31; H02K 7/09
(52) U.S. Cl. ............................ 324/207.16; 324/207.22; 324/207.23; 324/207.25; 310/90.5
(58) Field of Search ................... 324/207.15–207.18, 324/207.21, 207.22, 207.25, 207.24; 310/12, 90.5, 68 B; 341/15

(56) References Cited

U.S. PATENT DOCUMENTS

| 3,176,241 A | * | 3/1965 | Hogan et al. ................ 331/75 |
| 3,603,978 A | * | 9/1971 | Narukiyo ....................... 341/2 |
| 3,702,208 A | | 11/1972 | Habermann et al. |
| 4,535,289 A | * | 8/1985 | Abe et al. ............... 324/207.14 |
| 4,717,874 A | * | 1/1988 | Ichikawa et al. ........ 324/207.16 |
| 4,991,301 A | | 2/1991 | Hore |
| 5,248,940 A | | 9/1993 | Patience et al. |
| 5,355,041 A | * | 10/1994 | Shirao et al. ............... 310/90.5 |
| 5,530,306 A | * | 6/1996 | Ueyama ..................... 310/90.5 |
| 5,602,472 A | * | 2/1997 | Bergstedt et al. ....... 324/207.25 |
| 5,691,638 A | * | 11/1997 | Bahn ....................... 324/207.25 |
| 5,734,266 A | * | 3/1998 | Spies ..................... 324/207.22 |
| 6,603,230 B1 | * | 8/2003 | Abel .......................... 310/90.5 |

FOREIGN PATENT DOCUMENTS

| DE | 2848173 | 6/1980 |
| EP | 0287214 | 10/1988 |

* cited by examiner

Primary Examiner—N. Le
Assistant Examiner—Darrell Kinder
(74) Attorney, Agent, or Firm—Venable LLP; Eric J. Franklin (57) ABSTRACT

A method for determining the position of the rotor (5) of an electric machine in the radial direction (X, Y) and in the axial direction (Z) applies a cogged ring (2), through which the shaft (5a) of the rotor (5) is placed. The shaft (5a) is provided with an auxiliary ring (6) placed substantially at the cogged ring (2). The cogged ring is provided with at least three sets of cogs, wherein the cogs of the first set ($3a1$, $3a2$ ..., $3a8$) are used to measure the movement of the shaft (5a) in the radial direction (X, Y), the cogs of the second ($3b1$, $3b2$, $3b3$, $3b4$) and third ($3c1$, $3c2$, $3c3$, $3c4$) sets are used to measure the movement of the shaft (5a) in the axial direction (Z), and that the cogs of the second ($3b1$, $3b2$, $3b3$, $3b4$) and third ($3c1$, $3c2$, $3c3$, $3c4$) sets are placed, in the axial direction (Z), at least partly in a different location in relation to each other.

14 Claims, 7 Drawing Sheets

METHOD FOR DETERMINING THE POSITION OF THE ROTOR OF AN ELECTRIC MACHINE, AND A POSITION SENSOR

BACKGROUND OF THE INVENTION

The present invention relates to a method for determining the position of the rotor of an electric machine in the radial direction and in the axial direction, which method applies a cogged ring, which is placed around the shaft of the rotor. The invention also relates to a position sensor for determining the position of the rotor of an electric machine in radial direction and in axial direction, which position sensor comprises a cogged ring, through which the shaft of the rotor is arranged to be placed.

In magnetic bearings, the position of the rotor is normally measured in the axial direction and, at both ends of the rotor, in two radial directions, that is, with a total of five coordinates. On the basis of this measurement data, the flows of the magnets are controlled in such a way that the rotor is suspended in a desired position. A position sensor is an important part of the magnetic bearing system. The position sensor must be sufficiently accurate and substantially linear. It must have a good signal/noise ratio and a high intrinsic sensitivity. It should be reliable, inexpensive to manufacture, and as easy to install as possible. Furthermore, it is important that each coordinate is measured by at least two sensor parts from different directions to obtain a differential measurement. This will efficiently eliminate distortions caused by thermal expansions and contamination.

German patent application DE 2848173 presents a sensor arrangement for measuring the deviation of the shaft in the axial direction as well as in the radial direction. As the most substantial feature, the arrangement comprises a cogged ring arranged in connection with the shaft. Outside the ring, there is a fixed additional ring, in relation to which the measurement is taken. The width of the cogs in this cogged ring is greater than the width of the auxiliary ring in this axial direction of the rotor. In the cogged ring connected to the rotor, all the cogs are not in the same position in relation to the axial direction of the rotor, but the cogs can be divided into two sets, in which the cogs of the first set are placed mutually substantially in the same position in relation to the axial direction, and the cogs of the second set are placed mutually substantially in the same position and at least partly in a different position than the cogs of the first set, seen in the axial direction. The cogs of the ring are equipped with windings for producing and measuring a magnetic flux. The windings formed in the cogs of the first and second sets of cogs are intended to measure deviations in the radial and axial directions, respectively. When the rotor is in the desired position, the location of the windings measuring in the radial direction in relation to the auxiliary ring is such that the auxiliary ring is at the cogs of the first set. Measurement in the axial direction is arranged in such a way that the cogs of the second set are only partly at the auxiliary ring. Thus, a shift in the axial direction can be detected as a change in reluctance. This solution presented in the German application publication DE 2848173 has, however, some disadvantages in view of its use in connection with magnetic bearings. First of all, the sensor does not measure the axial direction differentially, but only as a change in one reluctance. Thus, the thermal expansion between the rotor and the stator is manifested in the axial measurement result. Thus, to produce an appropriate axial measurement, two such sensors, mounted in parallel, are needed. For measuring all the necessary degrees of freedom, a similar pair of sensors must also be installed at the other end of the rotor. If the differential measurement is implemented by installing only one sensor at each end of the rotor, this will result in a high precision requirement for installing the sensors. Furthermore, such a solution is still sensitive to thermal expansion. Secondly, in the presented solution, the cogs and coils are in the rotor. The cogged rotor will cause air friction at a high speed and has a poor mechanical strength. Furthermore, in the rotor rotating at a high speed, it is difficult to arrange the supply of electricity to the coils on the rotor side.

Another known sensor arrangement for measuring deviations in the radial and axial directions is that the rotor shaft is provided with a conical section. A position sensor is arranged in connection with this conical section. Thus, a deviation in both the axial and the radial directions can be detected in the rotor. This sensor arrangement involves, for example, the disadvantage that the machining of such a cone in the rotor requires extra work stages, and the machining with a sufficient precision is difficult. Between measurements in the radial and axial directions by a position sensor placed in connection with such a cone, there is a so-called cross connection; that is, a displacement of the rotor in, for example, the axial direction is also manifested in the measurement in the radial direction, and vice versa. Thus, to eliminate cross connections, the measurement results must be processed numerically in a relatively complicated way. Also this solution involves a requirement of high precision in the mounting and is sensitive to thermal expansions.

SUMMARY OF THE INVENTION

It is an aim of the present invention to provide a method for determining the position of the rotor of an electric machine in the radial and axial directions by using one sensor which is formed in such a way that some of the cogs of the sensor are used for measuring in the radial direction and some are used for measuring in the axial direction, to obtain a differential measurement. Another aim of the present invention is to provide a position sensor in which the above-mentioned drawbacks are eliminated to a large extent. The method according to the present invention is characterized in that an auxiliary ring is provided substantially at the location of a cogged ring on the shaft, that the cogged ring is provided with at least three sets of cogs, wherein the cogs of the first set of cogs are used to measure the movement of the shaft in the radial direction, the cogs of the second and third sets of cogs are used to measure the movement of the shaft in the axial direction, and that the cogs of the second and third sets of cogs are placed, in the axial direction, at least partly in a different location in relation to each other. The position sensor according to the present invention is characterized in that the shaft comprises an auxiliary ring placed substantially at the location of a cogged ring, that the cogged ring comprises at least three sets of cogs, wherein the cogs of the first set of cogs are arranged to be used to measure the movement of the shaft in the radial direction, the cogs of the second and third sets of cogs are arranged to be used to measure the movement of the shaft in the axial direction, and that the cogs of the second and third sets of cogs are placed, in the axial direction, at least partly in a different location in relation to each other. The invention is based on the idea that the position sensor is formed of a cogged ring which is placed around the rotor and the rotor is provided with a section in which the electric and/or magnetic properties differ from the rest of the structure of the rotor shaft, and that the cogs for measuring in the axial direction are arranged, in the axial direction, in at least two locations to make differential measurement possible.

The present invention shows remarkable advantages compared to solutions of prior art. When using the position sensor of the invention, a single sensor can be used to achieve a reliable measurement in the radial and axial directions, in which the effects of temperature can be taken into account better than in position sensors of prior art. Two position sensors according to the invention can be used to produce two separate items of differential information in the axial direction, i.e. one at each end of the rotor. Thus, the thermal expansion between the rotor and the stator can be detected. Furthermore, the position sensor according to the invention can be easily produced by using a sheet cogged in a specific way, combined as a set of sheets. Moreover, to use the position sensor according to the invention, no specific conical forms need to be shaped in the rotor shaft, but a straight shaft can be used.

BRIEF DESCRIPTION OF THE DRAWINGS

In the following, the present invention will be described in more detail with reference to the appended drawings, in which.

DETAILED DESCRIPTION OF THE PREFERRED EMBODIMENT

In the following, the invention will be described in more detail with the example of a position sensor based on the measurement of changes in magnetic flux. Let us first define some terms related to the cogged ring and the shaft, which shall be used below in this specification to describe different directions of viewing. The thickness of the cogged ring and the auxiliary ring formed on the shaft are measured in the axial direction Z of the shaft. The width of a cog, in turn, describes the dimension of a cog measured in the direction R of the circumference of the cogged ring. We shall still define the height of a cog in a direction substantially perpendicular to the width and thickness of the cog, i.e. in the direction of the normal N of the circumference. The position of the shaft in the radial direction is determined by measurements taken in two different directions X, Y.

Figure 1:
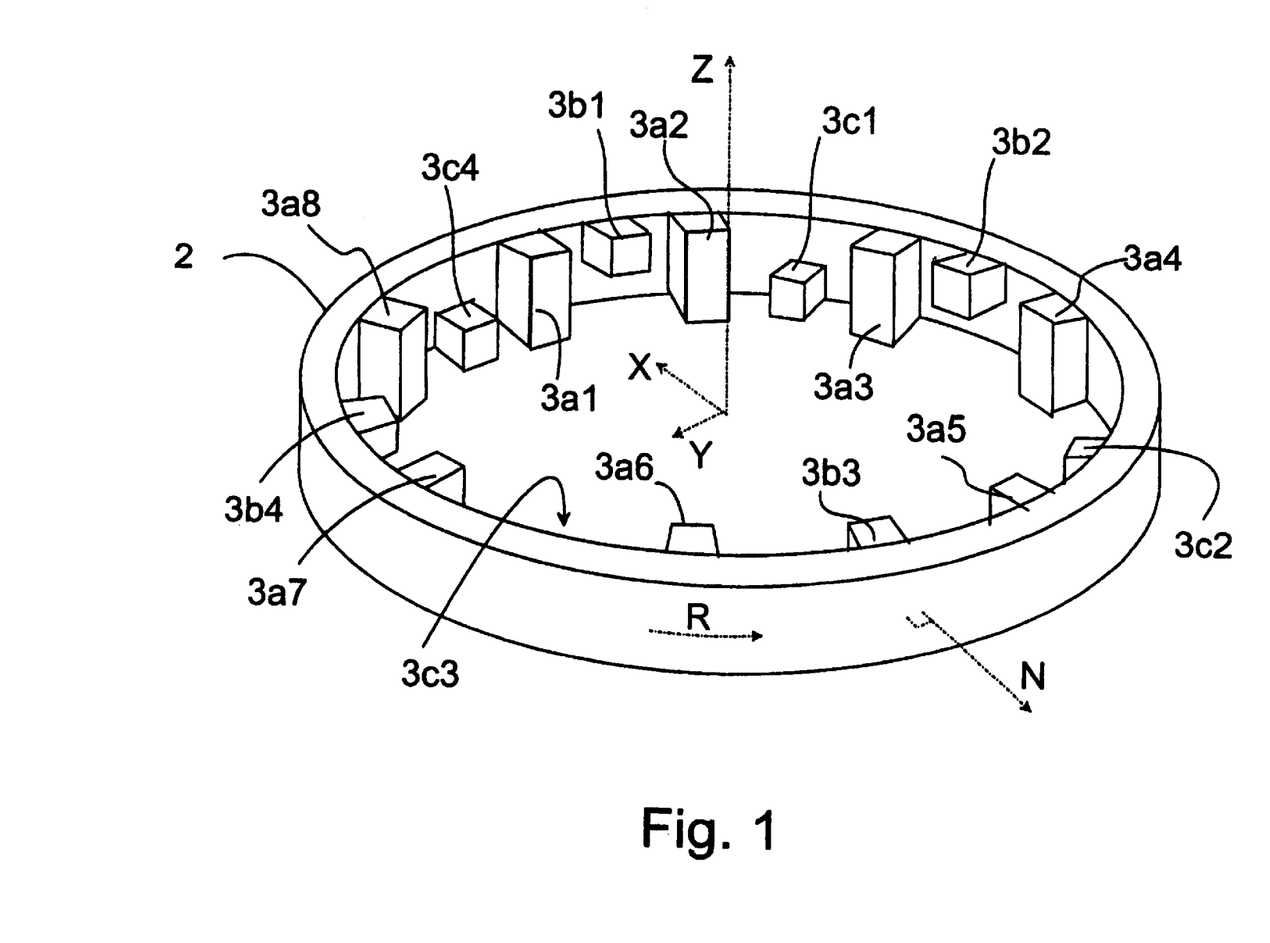
FIG. 1 shows a cogged ring of a position sensor according to an advantageous embodiment of the invention in a perspective view.

The appended FIG. 1 shows a cogged ring 2 of a position sensor 1 according to an advantageous embodiment of the invention in a perspective view. Also, all the above-mentioned different directions are indicated in FIG. 1 to illustrate the meaning of the above-mentioned terms. This cogged ring 2 is preferably made of thin sheets, such as transformer sheets. A sufficient number of these thin sheets are stacked on top of each other to achieve a thickness desired for the cogged ring. This plate is substantially such a plate which is provided with cogs of substantially two different sizes preferably so that the width of the cogs (in the circumferential direction) is substantially the same, but the height of the cogs (in the direction substantially perpendicular to the circumferential direction) is different. Thus, one part of the sheets is placed on top of each other in the same position, and another part of the sheets is placed on top of each other in such a way that the sheets are rotated to another position to form three types of cogs. In the following, we shall describe these different cog types in more detail, further referring to FIG. 1. Cogs of the first set substantially consist of cogs with the thickness of the cogged ring, indicated with the references 3a1, 3a2, . . . , 3a8 in FIG. 1. Correspondingly, cogs of the second set consist of cogs whose width is preferably substantially half of the thickness of the cogged ring and which are placed in the part on the side of the first surface 4a of the cogged ring. These cogs are indicated with the references 3b1, 3b2, 3b3, 3b4. Yet, cogs of the third set consist of cogs whose width is preferably substantially half of the thickness of the cogged ring and which are placed in the part on the side of the second surface 4b of the cogged ring. The cogs of this third set are indicated with the references 3c1, 3c2, 3c3, 3c4 in the appended FIG. 1. In the advantageous embodiment of FIG. 1, these sets of different cogs preferably alternate in such a way that every second cog is a cog 3a1, 3a2, . . . , 3a8 of the first set, and between these, there is a cog 3b1, 3b2, 3b3, 3b4 of the second set and a cog 3c1, 3c2, 3c3, 3c4 of the third set in an alternating manner. However, it is obvious that within the scope of the present invention, it is also possible to use another grouping than that presented herein. One alternative is that there are two cogs 3a1, 3a2, 3a8 of the first set in a sequence, followed by one cog 3b1, 3b2, 3b3, 3b4 of the second set and one cog 3c1, 3c2, 3c3, 3c4 of the third set. Another alternative is that the cogs of each set alternate e.g. in the order of second, first, third (3b1, 3a1, 3c1, 3b2, 3a2, 3c2, . . . ). This latter alternative is advantageous, for example, in a position sensor which can be split. This refers to a position sensor consisting of two or more parts which are placed in a given position around the rotor. Thus, such a sensor does not need to be threaded in its position, wherein also the rotor does not need to be removed in connection with removing or mounting of the position sensor. In the splittable position sensor 2, each part to be detached preferably comprises one or two cogs 3a1, 3a2, . . . , 3a8 of the first set and the same number of cogs of both the second set 3b1, 3b2, 3b3, 3b4 and the third set 3c1, 3c2, 3c3, 3c4.

Figure 2:
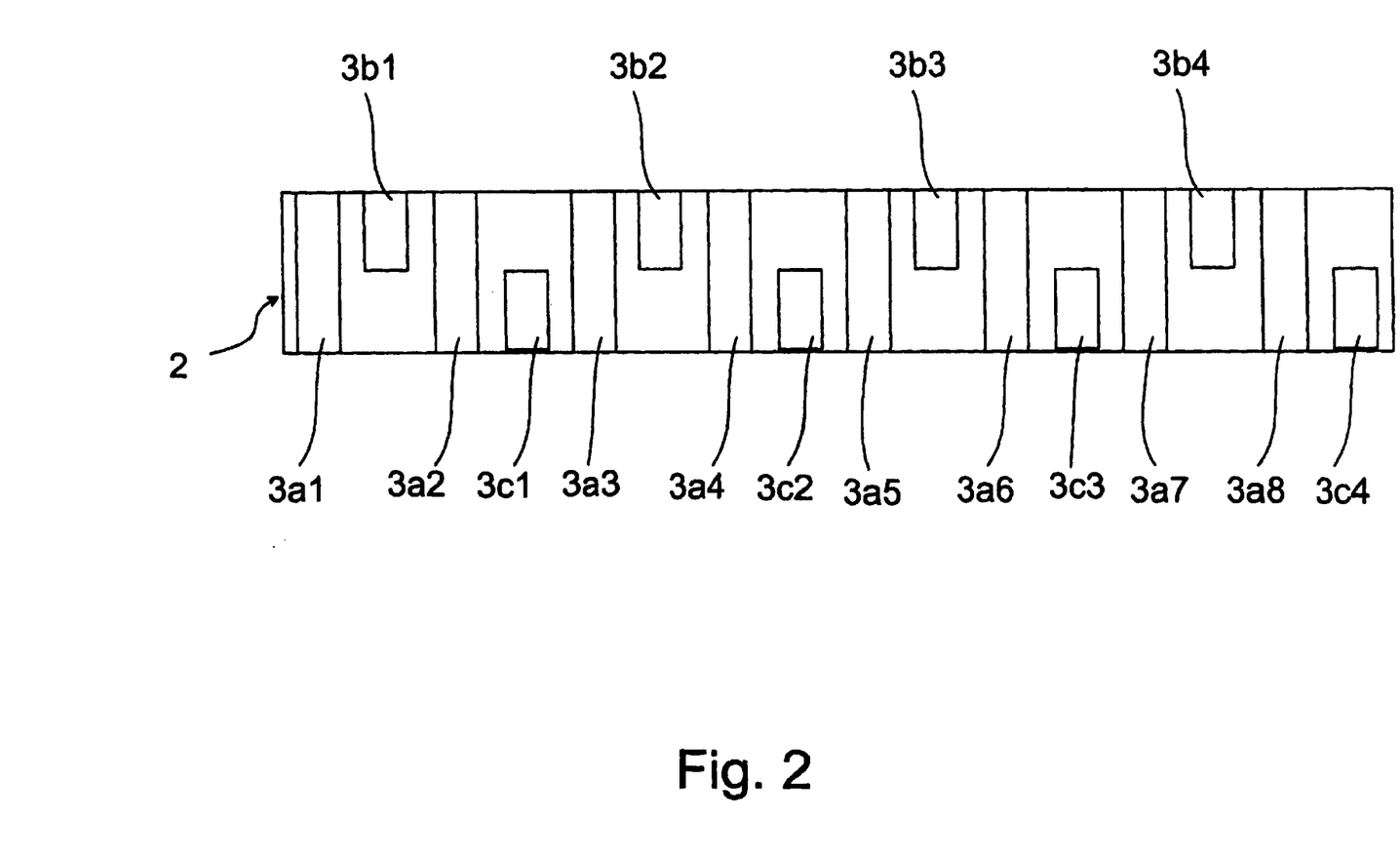
FIG. 2 shows the cogs of the cogged ring of FIG. 1 seen from the centre of the cogged ring in the direction of a normal of the circumferential surface of the cogged ring and turned 360°.

FIG. 2 also shows the position of the cogs of the cogged ring of FIG. 1 seen from the centre of the cogged ring in the direction of a normal of the circumferential surface of the cogged ring and turned 360° around the centre.

The shaft 5*a* of the rotor 5 is provided with an auxiliary ring 6 (FIGS. 3*a*–3*c*) with a magnetic conductivity clearly different from that in the other parts of the shaft 5*a*. This auxiliary ring 6 can be made of thin sheets in the same way as the cogged ring 2, or it can be formed of, for example, a powder metal or ferrite. The thickness of this auxiliary ring 6 in the axial direction is substantially smaller than the thickness of the cogs 3*a*1, 3*a*2, . . . , 3*a*8 in the first set; preferably, the thickness of this auxiliary ring 6 is about a half of the thickness of the cogs 3*a*1, 3*a*2, . . . , 3*a*8 of the first set, that is, substantially the same as the thickness of the cogs 3*b*1, 3*b*2, 3*b*3, 3*b*4, 3*c*1, 3*c*2, 3*c*3, 3*c*4 in the second and third sets. However, it is obvious that the thickness of the auxiliary ring 6 does not necessarily need to be substantially the same as the thickness of the cogs 3*b*1, 3*b*2, 3*b*3, 3*b*4, 3*c*1, 3*c*2, 3*c*3, 3*c*4 in the second and third sets. Thus, the cogs 3*a*1, 3*a*2, . . . , 3*a*8 of the first set can be used to measure a deviation in the radial direction. The cogs 3*b*1, 3*b*2, 3*b*3, 3*b*4 of the second set can be used to measure a deviation in the axial direction to achieve a first differential measurement result, and, correspondingly, the cogs 3*c*1, 3*c*2, 3*c*3, 3*c*4 of the third set can be used to measure a deviation in the axial direction to achieve a second differential measurement result. These differential and radial measurements will be presented below in this specification.

It is obvious that the cogged ring 2 can also be made of another material than the above-mentioned thin sheets. In this context, powder metal and ferrite should be mentioned as possible materials for the manufacture of the cogged ring.

The auxiliary ring 6 can also be a poorer magnetic conductor than the material surrounding it. The auxiliary ring 6 can be, for example, air, and it can be surrounded by sheet iron, or the auxiliary ring is of sheet iron and it is surrounded by air. At least the combinations presented in the following table are possible.

| Auxiliary ring 6 | Surrounding material |
| --- | --- |
| Sheet iron, ferrite or powder | Solid iron or air |
| Solid iron or air | Sheet iron, ferrite or powder |

The cogs 3*a*1, 3*a*2, . . . , 3*a*8, 3*b*1, 3*b*2, 3*b*3, 3*b*4, 3*c*1, 3*c*2, 3*c*3, 3*c*4 of the cogged ring 2 are provided with windings (indicated with references 8*a*, 8*b*, 8*c* in the appended FIGS. 3*a*, 3*b*, 3*c*) preferably so that an equal number of rotations is wound in each cog and a substantially equal winding wire is used in each winding 8*a*, 8*b*, 8*c*. Further, the winding direction used in each winding 8*a*, 8*b*, 8*c* is preferably the same direction, and the winding is started at the same point. In the measuring arrangement, the windings 8*a*, 8*b*, 8*c* are preferably grouped in such a way that in the radial measurement, two measuring signals are formed by windings which are on substantially opposite sides of the first set of cogs 3*a*1, 3*a*2, . . . , 3*a*8 in the X- and Y-directions, wherein changes in the first and second measuring signals indicate the direction and magnitude of the deviations in the X- and Y-directions, respectively. Correspondingly, for measuring in the axial direction, the windings 8*b* of the second set of cogs 3*b*1, 3*b*2, 3*b*3, 3*b*4 can be combined with each other to form a first differential measured value, and, correspondingly, the windings 8*c* of the third set of cogs 3*c*1, 3*c*2, 3*c*3, 3*c*4 can be combined with each other to form a second differential measured value. By combining the first and second differential measured values, it is possible to indicate the deviation of the shaft from the centre position in the axial direction.

Figure 3A:
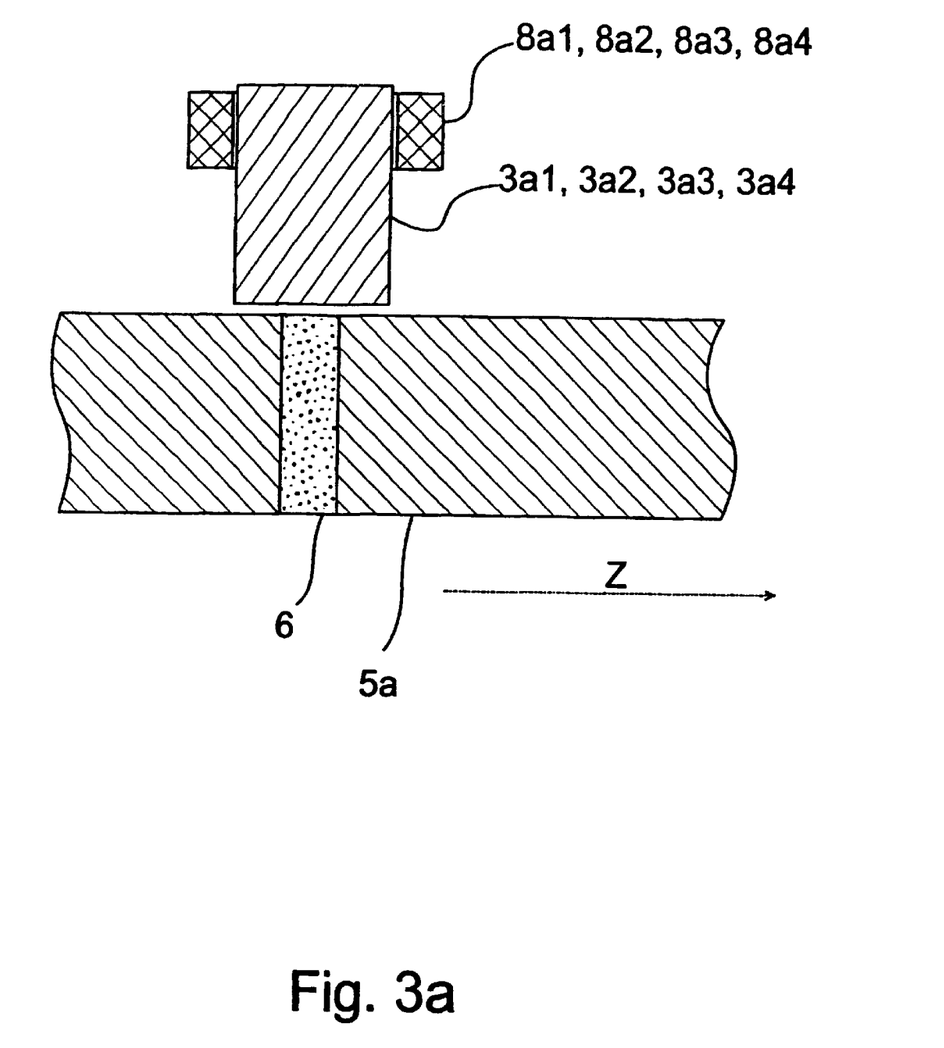
FIG. 3a shows, in a cross-section, a detail for the part of the shaft and the cogged ring in the case of a cog for measuring the radial direction, FIG. 3b correspondingly shows, in a cross-section, a detail of a cog measuring in a first differential direction, FIG. 3c correspondingly shows, in a cross-section, a detail of a cog measuring in a second differential direction.
Figure 3B:
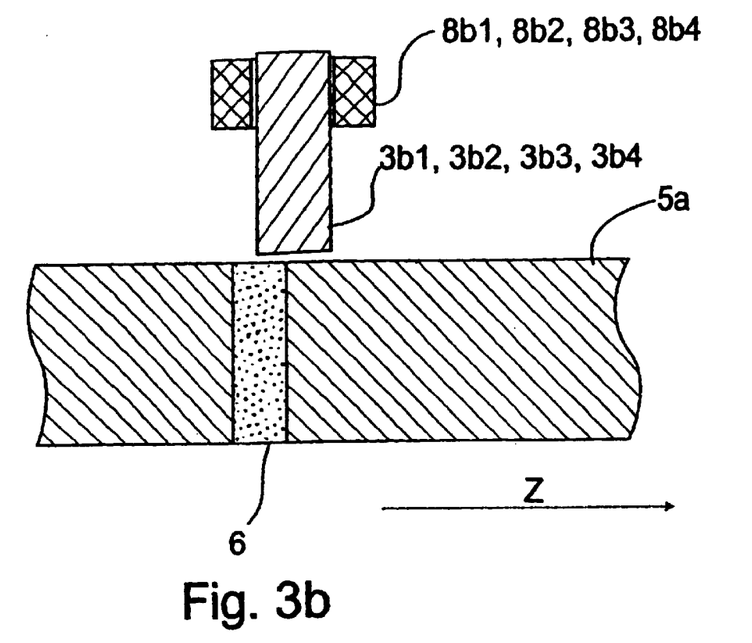
Figure 3C:
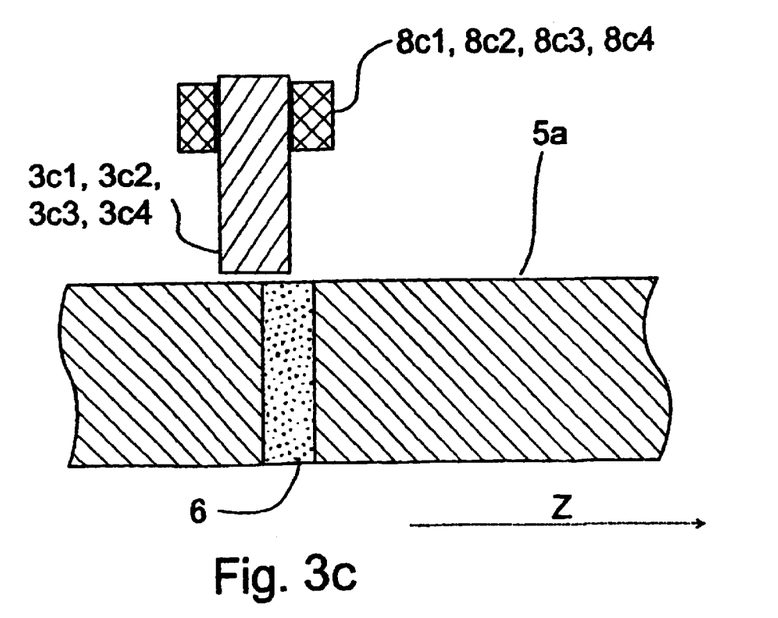

FIG. 3*a* shows a detailed enlargement of a cog 3*a*1, 3*a*2, . . . , 3*a*8 of the first set in a cross-sectional view. As the thickness of the section 6 is substantially smaller than the width of the cog 3*a*1, 3*a*2, . . . , 3*a*8, the measured value is not significantly affected by the location of the shaft 5*a*, if the auxiliary ring 6 is wholly placed at the cog 3*a*1, 3*a*2, . . . , 3*a*8. However, a deviation in the radial direction can be directly detected from the measurement result. In a corresponding manner, FIG. 3*b* shows the situation for a cog 3*b*1, 3*b*2, 3*b*3, 3*b*4 of the second set, and FIG. 3*c* shows a corresponding situation for a cog 3*c*1, 3*c*2, 3*c*3, 3*c*4 of the third set. In each case, the auxiliary ring 6 is only partly placed at the measuring cog 3*b*1, 3*b*2, 3*b*3, 3*b*4, 3*c*1, 3*c*2, 3*c*3, 3*c*4, wherein even a small movement in the axial direction of the shaft will change the measurement data accordingly. This change can be differentially detected in the windings 8*b*, 8*c* of the cogs of the second 3*b*1, 3*b*2, 3*b*3, 3*b*4 and third 3*c*1, 3*c*2, 3*c*3, 3*c*4 sets. This means that the change of the measuring signal in the winding 8*b* of the second set is reverse to the direction of change of the measuring signal in the winding 8*c* of the third set.

Figure 4A:
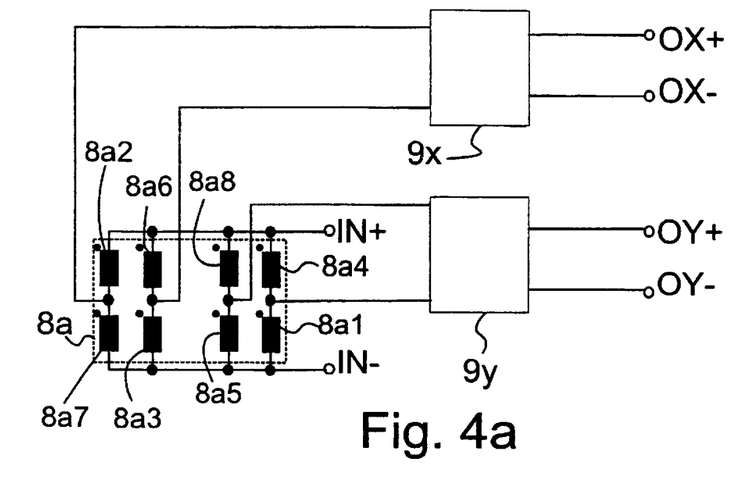
FIG. 4a shows, in a reduced chart, an advantageous arrangement for measuring the radial direction in connection with a position sensor according to an advantageous embodiment of the invention.
Figure 4B:
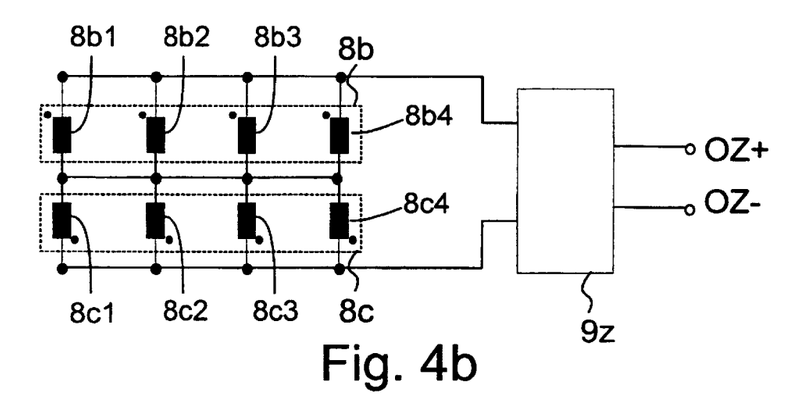
FIG. 4b shows, in a reduced chart, an advantageous arrangement for measuring the axial direction in connection with a position sensor according to an advantageous embodiment of the invention.
Figure 4C:
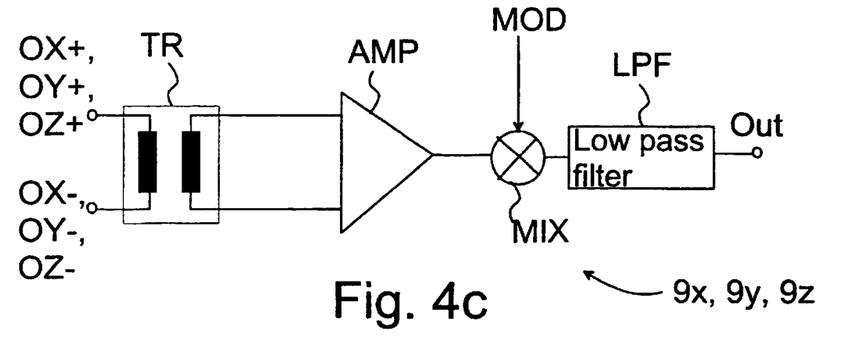
FIG. 4c shows, in a reduced chart, an advantageous structure for a measuring block in connection with measuring arrangements according to FIGS. 4a and 4b.

Furthermore, FIGS. 4*a*, 4*b* and 4*c* show reduced charts of some connections for measuring which can be applied in connection with a position sensor 1 according to the invention. FIG. 4*a* shows, in a reduced chart, an advantageous measuring arrangement in the radial direction in connection with a position sensor according to an advantageous embodiment of the invention, FIG. 4*b* shows, in a reduced chart, an advantageous measuring arrangement in the axial direction in connection with a position sensor according to an advantageous embodiment of the invention, and FIG. 4*c* shows, in a reduced chart, an advantageous structure for a measuring block 9*x*, 9*y*, 9*z* in connection with the measuring arrangements of FIGS. 4*a* and 4*b*. The windings 8*a*1, 81*a*, . . . , 8*a*8 of the first set of cogs 3*a*1, 3*a*2, . . . , 3*a*8 are provided with means IN+, IN– for inputting a measuring signal, such as a current, to produce a magnetic flux in the cogs 3*a*1, 3*a*2, . . . , 3*a*8 of the first set in the position sensor. This magnetic flux is transferred to the adjacent cogs which are preferably cogs of the second 3*b*1, 3*b*2, 3*b*3, 3*b*4 and third 3*c*1, 3*c*2, 3*c*3, 3*c*4 sets. This magnetic flux, which is affected, for example, by the position of the auxiliary ring 6 of the shaft 5*a* at the moment, in relation to these cogs of the second 3*b*1–3*b*4 and third 3*c*1–3*c*4 sets in the axial direction Z, can be measured from these windings 8*b*1, 8*b*2, 8*b*3, 8*b*4, 8*c*1, 8*c*2, 8*c*3, 8*c*4 of the second and third sets. Furthermore, the deviation in the radial direction will affect the components in the X- and Y-directions to be measured through the windings 8*a* of the first set of cogs. Thus, by measuring these X, Y and Z measurement values, the position of the shaft can be determined each time both in the radial direction and in the axial direction. To achieve this, a transformer 7 (FIG. 4*c*) is preferably coupled to each of these measured variables X, Y and Z for galvanic separation of the measuring signal and for separation of the windings 8*a*1, 8*a*2, . . . , 8*a*8, 8*b*1, 8*b*2, 8*b*3, 8*b*4, 8*c*1, 8*c*2, 8*c*3, 8*c*4 from the measurement circuit. The secondary coil of the transformer produces an output signal proportional to the measuring signal, which is amplified in a measuring block 9*x*, 9*y*, 9*z* implemented for each measuring signal and preferably comprising an amplifier AMP, a multiplier block MIX and a filter LPF, such as a low pass filter. The coupling of FIG. 4*c* can be applied in the measurement coupling in the radial direction according to FIG. 4*a* and in the measurement coupling in the axial direction according to FIG. 4b. To the multiplier block MIX is led a multiplier signal MOD which has substantially the same frequence as the measuring signal IN+, IN− and whose phase difference in relation to the measuring signal IN+, IN− is suitably set. This phase difference can be different in the measurements of the X and Y components in the radial direction as well as in the measurements in the axial direction. Thus, by measuring the current in the output poles OX+, OX−; OY+, OY−; OZ+, OX−, it is possible to calculate the real position of the shaft in the different directions. It is obvious that instead of said current measurement, it is also possible to use voltage measurement, wherein the corresponding changes, known as such for anyone skilled in the art, are made in the measurement coupling.

The above-presented arrangement for coupling the windings 8a, 8b, 8c is only an advantageous example solution, but in connection with the present invention, the windings 8a, 8b, 8c can also be implemented in a number of other ways. For example, the windings 8a4 and 8a5 can be exchanged with each other, as well as the windings 8a6 and 8a7. Also, the windings 8b1, 8b2, 8b3, 8b4 of the second set and the windings 8c1, 8c2, 8c3, 8c4 of the third set can be coupled in series instead of in parallel, or in such a way that some of the windings are coupled in parallel and some in series.

The frequency of the measuring signal IN+, IN− is preferably some tens of kilohertzes.

The amplifier AMP used is preferably an amplifier with a very low impedance, wherein it is possible to achieve a greater linear measuring range than with an amplifier with a high impedance. Furthermore, using an amplifier with a low impedance, the cable length has less effect on the measurement results than when using an amplifier with a high impedance.

Figure 6:
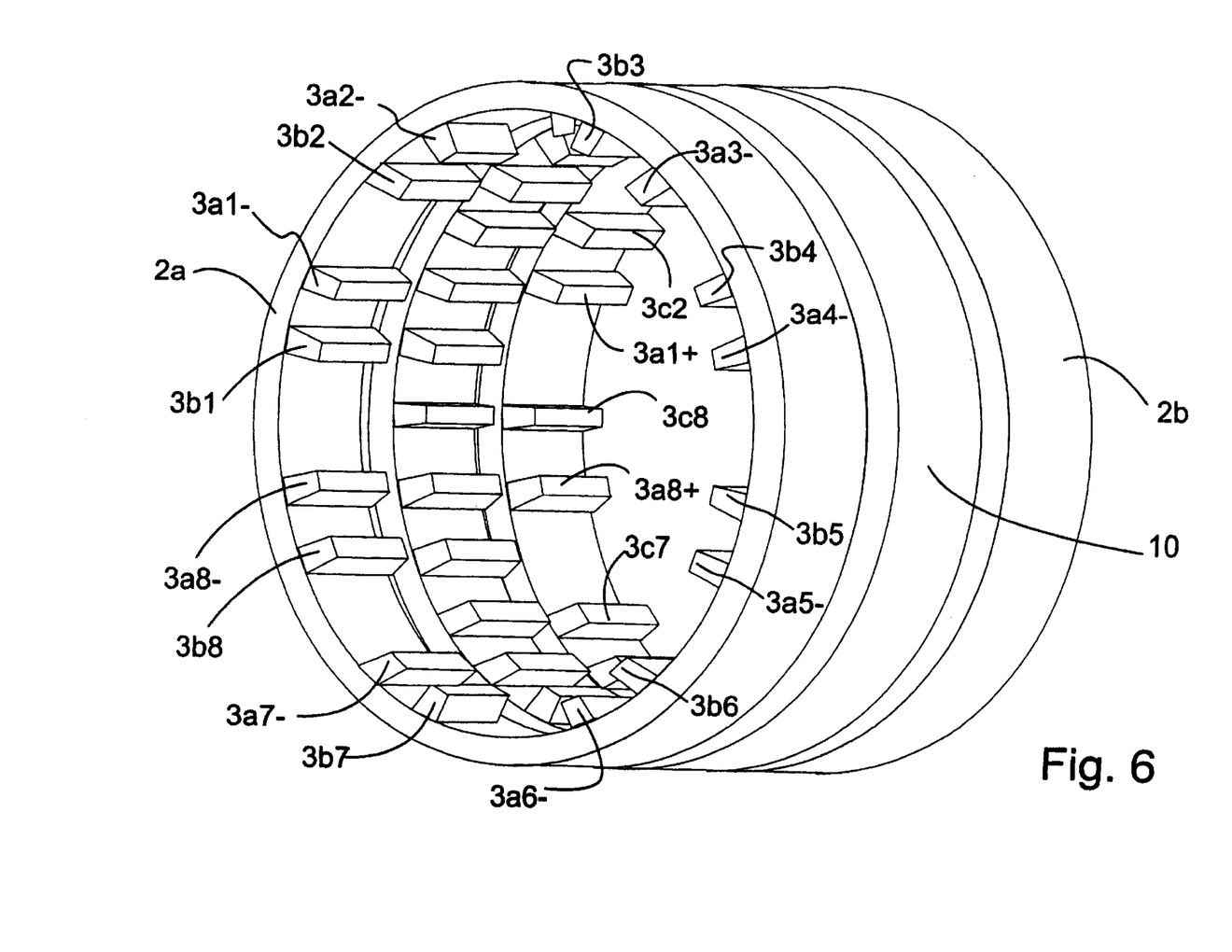
FIG. 6 shows cogged rings of a position sensor according to a second advantageous embodiment of the invention in a perspective view.

Furthermore, the appended FIG. 6 shows an arrangement in which the cogged ring 2 of the sensor 1 consists of two parts in the axial direction. Thus, the first part 2a and the second part 2b do not need to be placed at the same point in the axial direction, but these parts 2a, 2b can be placed, for example, on different sides of a radial bearing 10, as shown in the example of FIG. 6. This embodiment has, for example, the advantage that the first part 2a and the second part 2b of the cogged ring can be identical with each other. Furthermore, all the cogs 3a1–3a8, 3b1–3b4, 3c1–3c4 can be equal to each other. Also, this solution has the advantage that the auxiliary ring 6 used can be a shaft ring belonging to the radial bearing 10, being preferably made of sheet iron (not shown). If necessary, the thickness of this shaft ring is increased in such a way that when the parts 2a, 2b of the cogged ring in the position sensor 1 are installed in their position, the shaft ring is partly placed at the cogs 3a1–3a8, 3b1–3b4, 3c1–3c4.

Each cog 3a1–3a8 of the first set preferably consists of at least two cogs of both parts 2a, 2b of the cogged ring, substantially placed at the same position in the radial direction; that is, they form a pair of cogs. These cogs are indicated with the references 3a1+ to 3a8+, 3a1− to 3a8− in the appended figure. The windings of each pair of cogs 3a1+, 3a1−; 3a2+, 3a2−; . . . ; 3a8+, 3a8− are preferably coupled in series. Thus, it is possible to apply the coupling of FIG. 4a, in which each coil 8a1, 8a2, . . . , 8a8 consists of coils of these pairs of cogs 3a1+, 3a1−; 3a2+, 3a2−; . . . ; 3a8+, 3a8− coupled in series. In this embodiment, the cogs 3b1–3b8 of the second set, whose number is eight in this preferred embodiment, are placed, for example in the first part 2a of the cogged ring, and the cogs 3c1–3c8 of the third set, whose number in this preferred embodiment is also eight, accordingly, are thus placed in the second part 2b of the cogged ring. The windings 8b1–8b4 of the second set of cogs and the windings 8c1–8c4 of the third set of cogs can be made as presented above in connection with the description of the first embodiment. It is obvious that the parts 2a, 2b of the cogged ring can also be divided into two or more parts in the radial direction, wherein the installation of the position sensor does not require that the rotor is removed.

Such an arrangement, in which the position sensor 1 and the radial bearing 10 are placed very close to each other, also facilitates the implementation of the control system. This is due, for example, to the fact that the information obtained from the position sensor substantially corresponds to the situation at the radial bearing.

In an advantageous embodiment, in which the position sensor 1 is divided into at least two parts in the axial direction, both parts 2a, 2b can further be made substantially identical for the part of the cogging in such a way that the cogs are spaced by substantially regular spaces from each other. In this case, advantageously every second pair of cogs 3a1+, 3a1−; 3a2+, 3a2−; . . . ; 3a8+, 3a8− forms a cog 3a1–3a8 of the first set measuring in the radial direction, wherein in the first part 2a of the ring, every second cog forms a cog 3b1–3b8 of the second set, and, correspondingly, in the second part 2b of the ring, every second cog forms a cog 3c1–3c8 of the third set.

Tests have shown that in the position sensor according to the present invention, cross connection in the radial and axial directions does not occur to such an extent that it would affect the measurement result, wherein no cross connection compensation needs to be performed in the further processing of the measuring signals.

Figure 5:
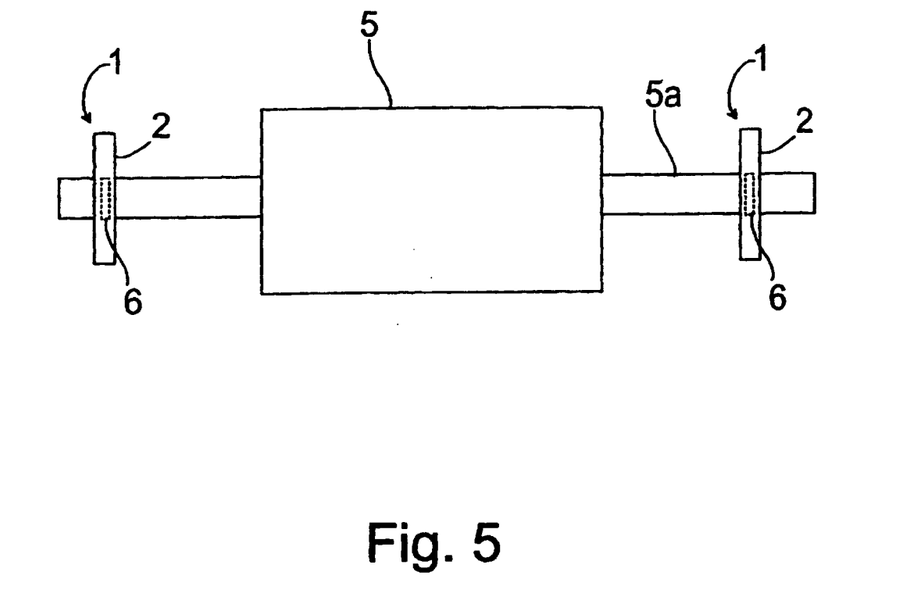
FIG. 5 shows an arrangement in which two position sensors of the invention can be used to compensate for the thermal expansion of the shaft.

Further, the appended FIG. 5 shows an arrangement in which two position sensors 1 according to the invention can be used to detect thermal expansion of the shaft 5a. Using the position sensor according to the invention, a reliable axial measurement result can be obtained from both ends of the rotor, i.e. from both ends of the mutual position of the stator and the rotor. By means of these two items of information, the axial position of the rotor can be controlled in such a way that the relatively small clearances between the rotor and the stator, such as the clearance labyrinths between the casing and the compressor wheel (not shown) and the air gaps between the axial bearings (not shown), can be kept in good balance. From this information, it is also possible to estimate the rotor temperature.

Although the use of measurement of the magnetic flux was presented above in connection with the position sensor 1 according to the invention, it is obvious that, for example, capacitive measurement can be applied in connection with the invention. Thus, no windings 8a, 8b, 8c will be needed, but the measurement is taken by detecting changes in the capacitance. The cogs 3a1, 3a2, . . . , 3a8, 3b1, 3b2, 3b3, 3b4, 3c1, 3c2, 3c3, 3c4 of the cogged ring form one plate each in the capacitor, and the auxiliary ring 6 forms a second plate in the capacitor. The electrical properties of the auxiliary ring 6 differ from the electrical properties of the shaft 5a, wherein a displacement of the shaft in the radial and axial directions can be detected as a change in the capacitance. The change in the capacitance can, as such, be measured e.g. by means of a change in the electric field.

The present invention is not limited solely to the above-presented embodiments, but it can be modified within the scope of the appended claims.

What is claimed is:

1. The method for determining the position of the rotor (5) of an electric machine in the radial direction (X, Y) and in the axial direction (Z), which method applies a cogged ring (2), which is placed around the shaft (5a) of the rotor (5a), characterized in that an auxiliary ring (6) is provided substantially at the location of the cogged ring (2) on the shaft (5a), that the cogged ring is provided with at least three sets of cogs, wherein the cogs of the first set (3a1, 3a2, . . . , 3a8) are used to measure the movement of the shaft (5a) in the radial direction (X, Y), the cogs of the second (3b1, 3b2, 3b3, 3b4) and third (3c1, 3c2, 3c3, 3c4) sets are used to measure the movement of the shaft (5a) in the axial direction (Z), and that the cogs of the second (3b1, 3b2, 3b3, 3b4) and third (3c1, 3c2, 3c3, 3c4) sets are placed, in the axial direction (Z), at least partly in a different location in relation to each other.

2. The method according to claim 1, characterized in that the thickness of the auxiliary ring (6) in the axial direction is substantially smaller than the thickness of the cogged ring (2) in the axial direction.

3. The method according to claim 1, characterized in that the thickness of the cogs of the second (3b1, 3b2, 3b3, 3b4) and third (3c1, 3c2, 3c3, 3c4) sets is substantially half of the thickness of the cogs of the first set (3a1, 3a2, . . . , 3a8) in the axial direction.

4. The method according to claim 1, characterized in that the thickness of the cogs of the second (3b1, 3b2, 3b3, 3b4) and third (3c1, 3c2, 3c3, 3c4) sets is substantially the same as the thickness of the auxiliary ring (6) in the axial direction.

5. The method according to claim 1, characterized in that the thickness of the cogs of the second (3b1, 3b2, 3b3, 3b4) and third (3c1, 3c2, 3c3, 3c4) sets is greater than the thickness of the auxiliary ring (6) in the axial direction.

6. The method according to claim 1, characterized in that the cogged ring is equipped with windings (8a, 8b, 8c) for producing a magnetic flux and for measuring changes in the magnetic flux, and that the magnetic properties of the auxiliary ring (6) substantially differ from the magnetic properties of the shaft (5a).

7. A position sensor (1) for determining the position of the rotor (5) of an electric machine in the radial direction (X, Y) and in the axial direction (Z), the position sensor (1) comprising a cogged ring (2), which is arranged to be placed around the shaft (5a) of the rotor (5a), characterized in that the shaft (5a) comprises an auxiliary ring (6) placed substantially at the location of the cogged ring (2), that the cogged ring comprises at least three sets of cogs, wherein the cogs of the first set (3a1, 3a2, . . . , 3a8) are arranged to be used to measure the movement of the shaft (5a) in the radial direction (X, Y), the cogs of the second (3b1, 3b2, 3b3, 3b4) and third (3c1, 3c2, 3c3, 3c4) sets are arranged to be used to measure the movement of the shaft (5a) in the axial direction (Z), and that the cogs of the second (3b1, 3b2, 3b3, 3b4) and third (3c1, 3c2, 3c3, 3c4) sets are placed, in the axial direction (Z), at least partly in a different location in relation to each other.

8. The position sensor (1) according to claim 7, characterized in that the thickness of the auxiliary ring (6) in the axial direction is substantially smaller than the thickness of the cogged ring (2) in the axial direction.

9. The position sensor (1) according to claim 7, characterized in that the thickness of the cogs of the second (3b1, 3b2, 3b3, 3b4) and third (3c1, 3c2, 3c3, 3c4) sets is substantially half of the thickness of the cogs of the first set (3a1, 3a2, . . . , 3a8) in the axial direction.

10. The position sensor (1) according to claim 7, characterized in that the thickness of the cogs of the second (3b1, 3b2, 3b3, 3b4) and third (3c1, 3c2, 3c3, 3c4) sets is substantially the same as the thickness of the auxiliary ring (6) in the axial direction.

11. The position sensor (1) according to claim 7, characterized in that the thickness of the cogs of the second (3b1, 3b2, 3b3, 3b4) and third (3c1, 3c2, 3c3, 3c4) sets is substantially greater than the thickness of the auxiliary ring (6) in the axial direction.

12. The position sensor (1) according to claim 7, characterized in that the cogged ring is equipped with windings (8a, 8b, 8c) for producing a magnetic flux and for measuring changes in the magnetic flux, and that the auxiliary ring (6) is arranged to have substantially different magnetic properties from the magnetic properties of the shaft (5a).

13. The position sensor (1) according to claim 7, characterized in that the cogged ring consists of at least a first part (2a) and a second part (2b), wherein the cogs of the first set consist of some cogs (3a1– to 3a8–) of the first part (2a) and some cogs (3a1+ to 3a8+) of the second part (2b), that the cogs (3b1 to 3b8) are formed in the first part (2a) of the cogged ring, and that the cogs (3c1 to 3c8) of the third set are formed in the second part (2b) of the cogged ring.

14. The position sensor (1) according to claim 13, characterized in that a radial bearing (10) is placed between the first part (2a) and the second part (2b) of the cogged ring, to be used for bearing of the rotor.

* * * * *